Oct. 13, 1942.   S. T. MORELAND ET AL   2,298,716
MACHINE FOR MOLDING THERMOPLASTICS
Filed Oct. 6, 1939   6 Sheets-Sheet 1
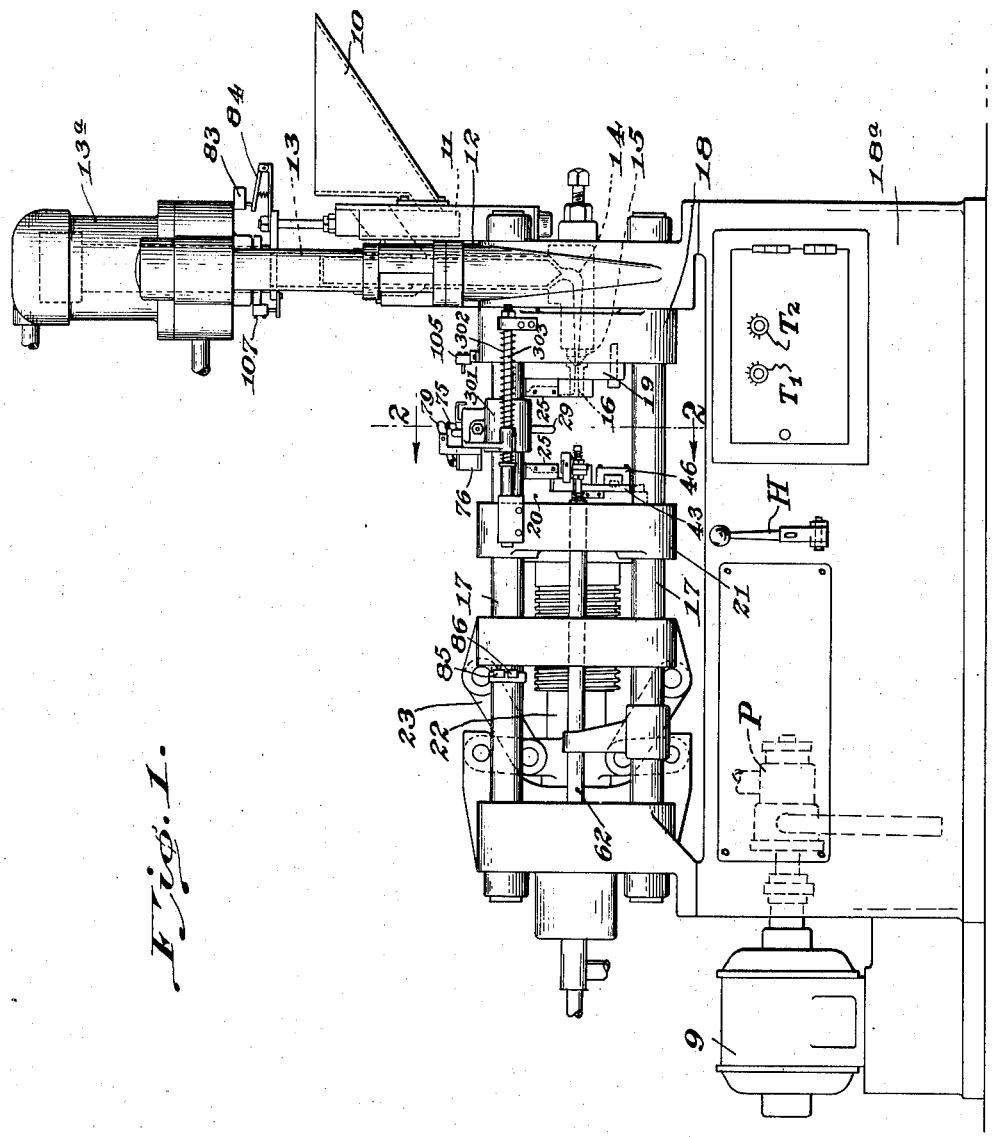
INVENTORS.
S. T. Moreland, V. E. Hofmann
and P. C. Tracy
BY
ATTORNEYS.

Oct. 13, 1942.  S. T. MORELAND ET AL  2,298,716
MACHINE FOR MOLDING THERMOPLASTICS
Filed Oct. 6, 1939   6 Sheets-Sheet 2
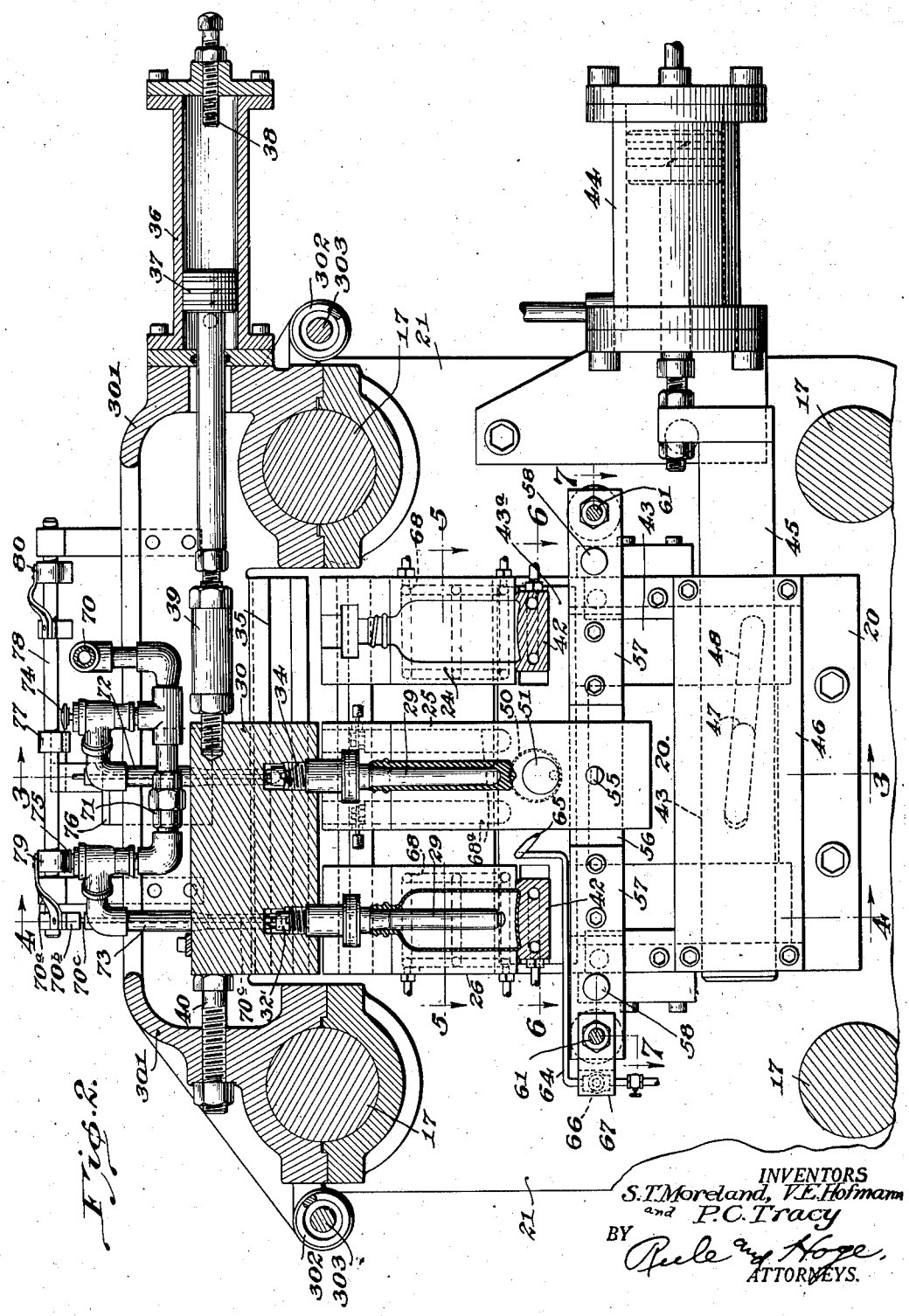
INVENTORS
S. T. Moreland, V. E. Hofmann
and P. C. Tracy
BY
ATTORNEYS.

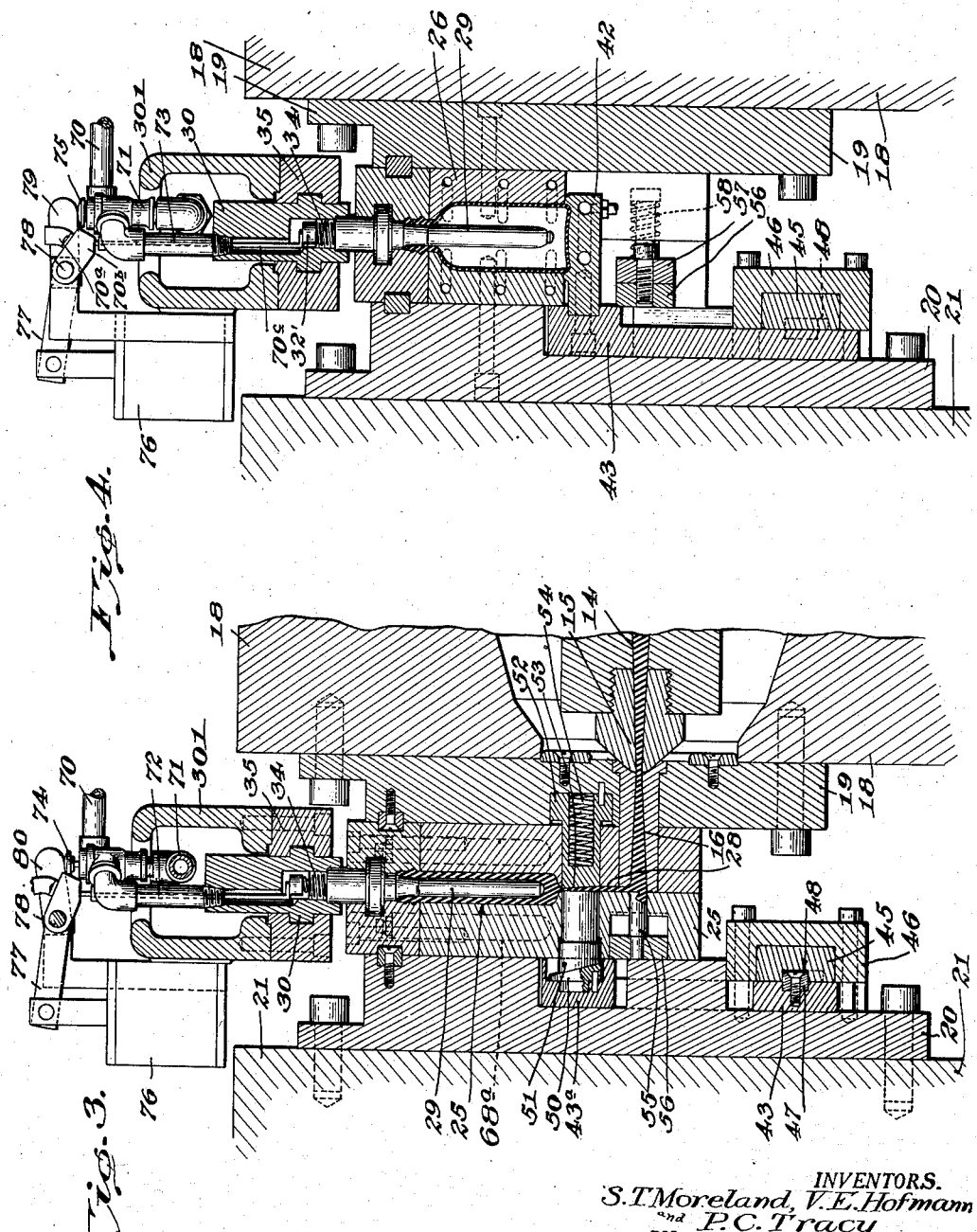

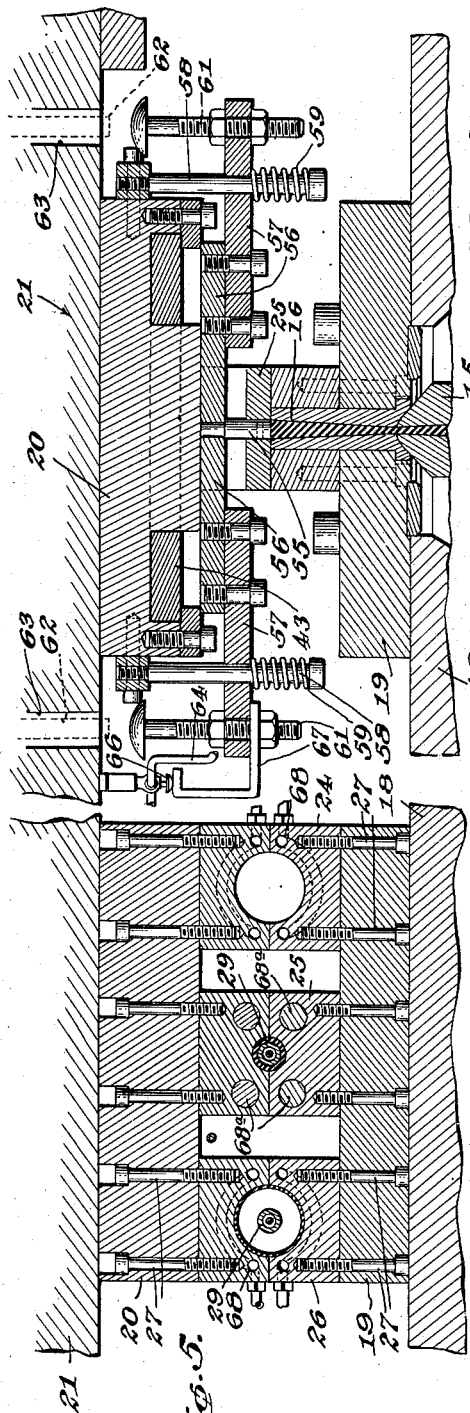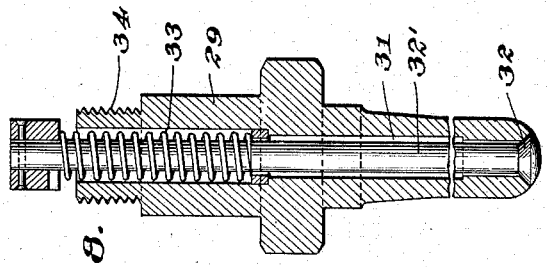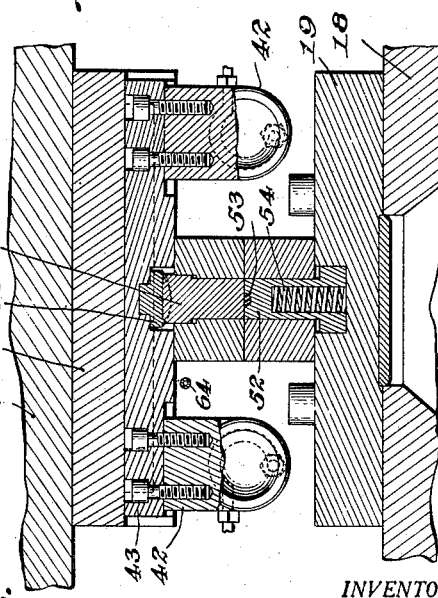

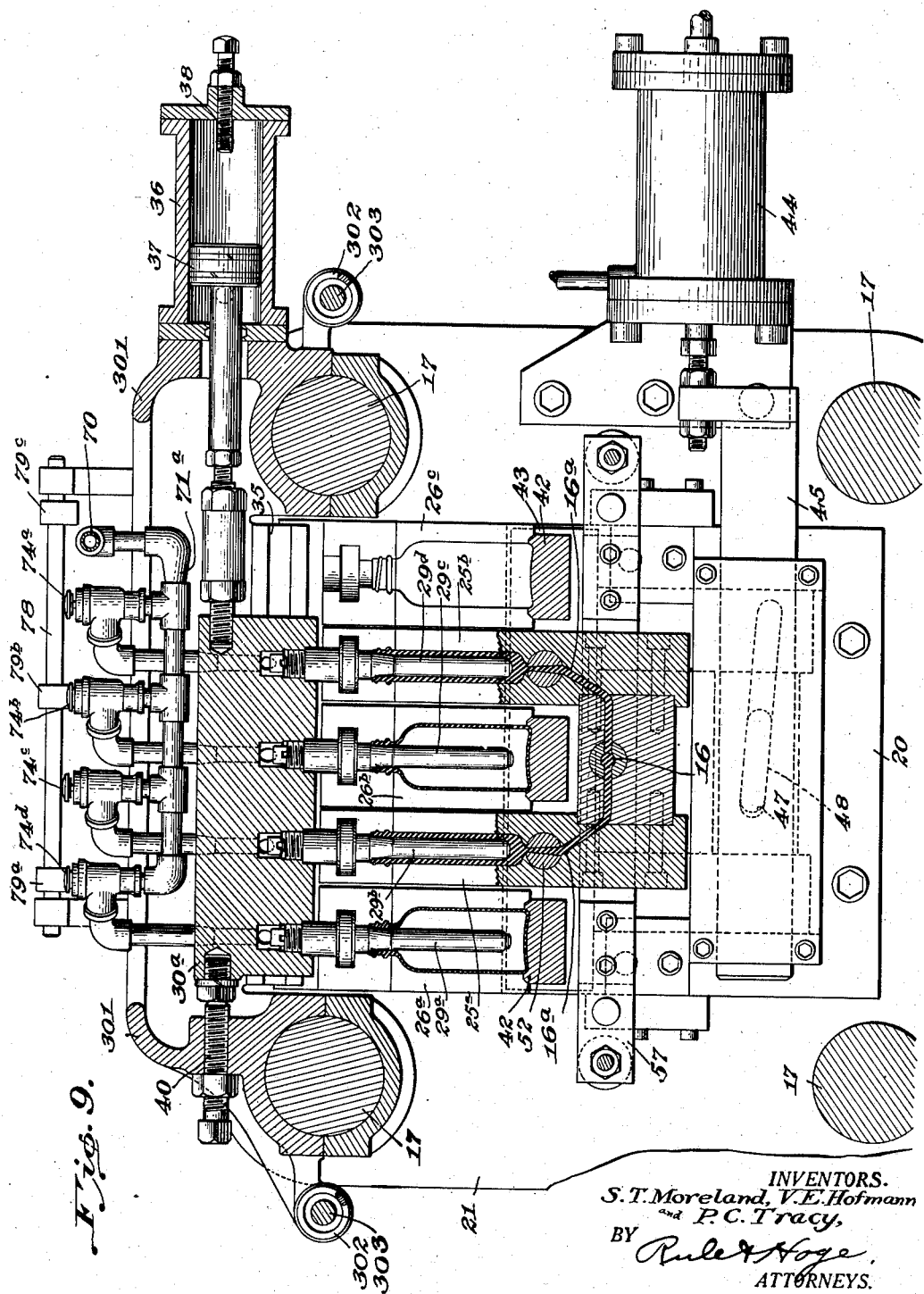

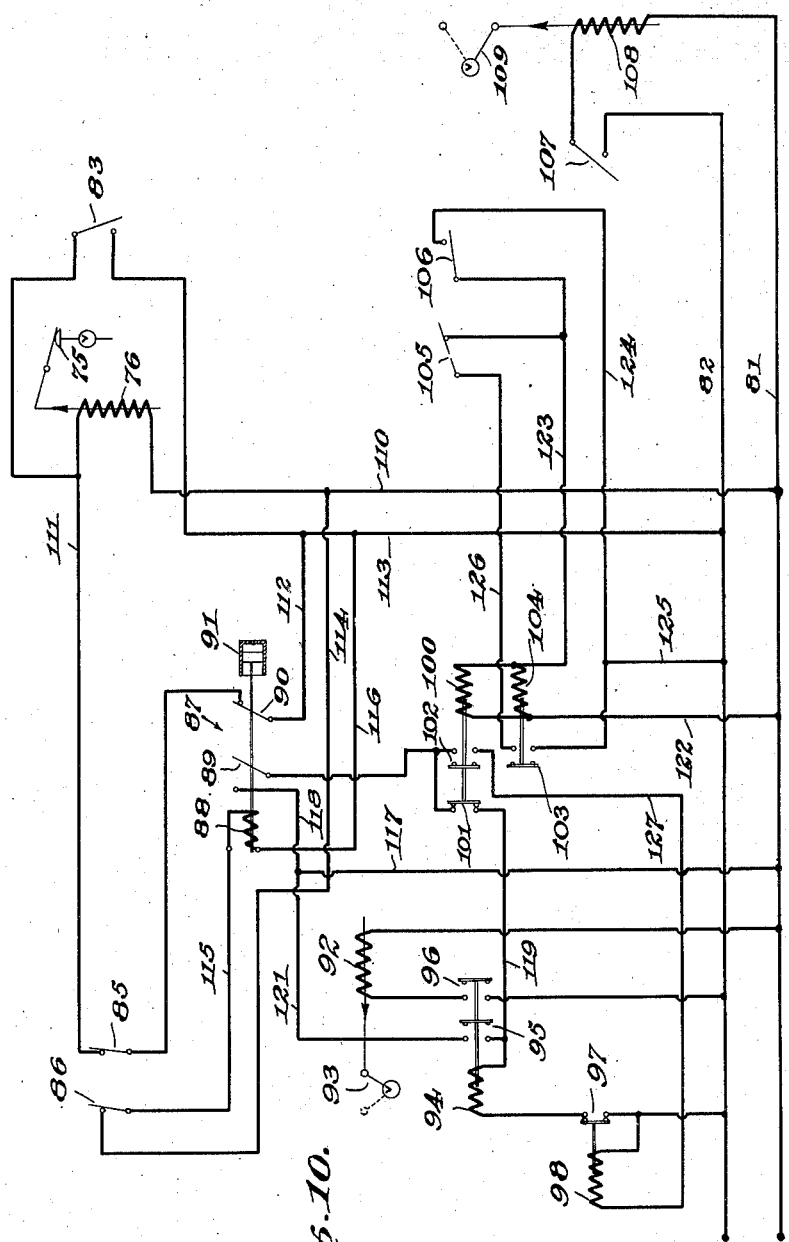

Patented Oct. 13, 1942

2,298,716

UNITED STATES PATENT OFFICE 2,298,716

MACHINE FOR MOLDING THERMOPLASTICS

Stephen T. Moreland, Victor E. Hofmann, and Parker C. Tracy, Toledo, Ohio, assignors to Owens-Illinois Glass Company, a corporation of Ohio Application October 6, 1939, Serial No. 298,194

18 Claims. (Cl. 18—30)

Our invention relates to machines for molding organic plastics including thermoplastic and thermosetting materials, in the manufacture of bottles, jars and various other articles. An object of the invention is to provide an improved, automatically operated machine for forming hollow articles of plastic materials which are blown in molds for forming the articles.

A further object of the invention is to provide automatically operated mechanism for blowing bottles or other articles in molds, combined with a conventional injection type of plastic molding machine.

Other objects of the invention will appear hereinafter.

Referring to the accompanying drawings:

Fig. 1 is an elevation view, partly diagrammatic, illustrating a machine embodying the present invention;

Fig. 2 is a sectional elevation at the line 2—2 on Fig. 1;

Figs. 3 and 4 are sectional elevations at the lines 3—3 and 4—4 respectively on Fig. 2;

Figs. 5, 6, and 7 are sectional plan views taken at the correspondingly designated section lines on Fig. 2;

Fig. 8 is a sectional detail view of a plug on which the parisons are formed;

Fig. 9 is a view similar to Fig. 2 illustrating a modified construction; and

Fig. 10 is a diagram of the electrical circuits and controls.

The machine as herein shown is adapted for molding bottles from plastic material which may be supplied to the machine in granular form and fed in measured quantities into a heating chamber where the material is heated and subjected to pressure and thereby converted to a plastic condition and then injected into a parison mold or molds for forming hollow parisons. The latter are then transferred to finishing molds in which they are blown to final form by means of air or other fluid under pressure.

Referring particularly to Fig. 1, the molding material is fed in granular form to a supply hopper 10. A feeder block or plunger 11 which is adjustable to control the amount of material supplied for each charge, is operatively connected to an injection plunger 13 and reciprocated therewith for feeding individual charges of material to a heating chamber 12 in which the material is converted to a plastic condition. The plunger 13 is reciprocated vertically by the piston of a hydraulic motor 13$^a$ and forces the material through the heating chamber and through a passageway 14 to a nozzle 15 and thence through a sprue hole or passageway 16 communicating with the dies.

The framework of the machine comprises four horizontal cylindrical tie bars or rails 17 surmounting the machine base 18$^a$. A bolster plate 18 having a fixed mounting on the rails carries a stationary die plate 19 bolted thereto. A movable die plate 20 is bolted to a bolster plate 21 mounted to reciprocate toward and from the plate 18. The plate 21 may be reciprocated by a hydraulic motor 22 operating in a conventional manner through connections including toggles 23.

The machine as illustrated in Fig. 1, is in the main, of conventional construction, except as to the molds and appurtenant mechanism mounted between the pillow blocks 18 and 21, and the control devices for the molding mechanism. An electric motor 9 may be used to drive a fluid pump P for supplying oil or other fluid under pressure to the hydraulic system including the hydraulic motors 13$^a$ and 22. An operating handle or lever H is used in operating the machine to close the molds and to begin the operating cycle of the machine. An electric timer $T^1$ is placed in the main control circuit to limit the duration of the stroke of the ram 13 or time it remains down, and a timer $T^2$ acts to automatically open the molds after a predetermined elapsed time.

Mounted on the die plates 19 and 20, are dies or molds 24, 25, and 26 (see Fig. 5). Each mold comprises partible sections attached respectively by bolts 27, to the die plates 19 and 20. Each mold half or section includes a neck mold section and a body mold section made in separate pieces. When the mold halves are brought together, molding material is forced through the sprue hole 16 and thence into the mold cavity of the parison mold 25 through a vertical gate or riser 28 (Fig. 2) formed in the face of the stationary section of the parison mold.

A pair of plungers or forming plugs 29 carried on a slide block 30, are enclosed alternately in the parison mold and serve as a core to form the interior of the parisons. Referring to Fig. 8, the plug 29 is formed with a vertical bore or opening 31 extending therethrough. A valve 32 forms the lower end or tip of the plunger. The valve stem 32' extends through the opening 31 and has mounted thereon a coil spring 33 by which the valve is held closed except when air under pressure is supplied through the plunger as hereinafter described for blowing the parison in the finishing mold and thereafter for ejecting the blown article from the plug 29. The upper end portion of the plug is screw-threaded at 34 for attachment to the slide block 30.

The block 30, which serves as a carriage for the plugs 29, is mounted to reciprocate transversely of the machine on guide rails 35. The guide rails are bolted to the lower surface of a frame 301 which is mounted for reciprocating movement on the upper frame members 17 to permit the plugs 29 to be moved away from the die plate 16 to an intermediate position between the open mold sections as shown in Fig. 1, when the mold sections are separated. The outward movement of the carriage 30 is effected by coil springs 302 mounted on rods 303, the latter carried by brackets on the pillow blocks.

The cycle of operations of the molds may be described as follows:

When a parison has been formed in the mold 25, as shown in Fig. 2, the die plates are separated, permitting the frame 301 to move the carriage 30 outward to a central position between the open molds. The carriage is then moved to the right (Fig. 2) and carries the plug 29 with the parison thereon into register with the finishing mold 24. During this movement the blown bottle on the other plug is ejected and discharged from the machine as hereinafter described, while the plug from which the bottle is discharged is brought into position between the sections of the open parison mold. The molds are then closed, the formed parison blown in the finishing mold 24, and concurrently a new charge of plastic material is injected into the parison mold and forms another parison. The molds are again opened, the carriage moved to the left, the last formed bottle ejected during such movement, and the molds then closed. The last formed parison, now in the finishing mold 26, is blown to finished form while a new parison is formed in the parison mold, thus completing the cycle.

The carriage 30 is reciprocated by an air motor 36 including a reciprocating piston 37, the movement of which in one direction is limited by an adjustable stop 38. The piston rod has an adjustable connection 39 with the block 30. An adjustable stop 40 limits the movement of the block 30 in the opposite direction.

Bottom plates 42 (Figs. 2, 4, 6) for the finishing molds, are bolted to a slide plate 43 movable up and down for lifting and lowering the bottom plates. The means for lifting and lowering the bottom plates includes an air operated piston motor 44 (Fig. 2). The piston rod of the motor is connected to a horizontal slide bar 45 for reciprocating the latter horizontally in a guideway formed in a guide plate 46 bolted to the die plate 20. A key 47 attached to the plate 43, engages an inclined keyway 48 formed in the bar 45. As shown in Figs. 2 and 4, the mold bottoms 42 are held in their lifted or operative position. When the motor 44 is actuated to move the bar 45 to the left, the key 47 is cammed downward, thereby lowering the mold bottoms 42, preliminary to opening of the molds.

When the plate 43 is lowered, the sprue is severed at the lower end of the parison by the following means: a wedge-shaped cam 50 (Fig. 3) attached to a cross-member 43ᵃ of the plate 43, engages the inclined end face of a cylindrical slide block 51 which is mounted for limited endwise movement in the parison mold or die plate 25. When the plate 43 is in its lifted position the outer or forward end of the block 51 is flush with the face of the die plate as shown in Fig. 6. A slide block 52 in alignment with the block 51, is mounted for lengthwise reciprocating movement, being supported in the die plate 19 and the attached section of the parison mold 25. The outer face of the block abuts the block 51 and is formed with a vertical groove 53 which provides a channel for that portion of the sprue which traverses the parts 51 and 52.

When the plate 43 is lowered for lowering the mold bottoms, the wedge 50 is carried downward, permitting a coil spring 54 housed in the block 52, to move the blocks 52 and 51 to the left (Fig. 3) so that the sprue is severed at the lower end of the parison. The sprue hole 53 leading from the parison downward through the block 52 is tapered, being quite narrow at the upper edge of the block 52 and wider at the lower edge. The severing movement of the block is sufficient to completely sever the sprue from the parison but leaves the sprue intact.

Means for ejecting the sprue when the mold is opened includes a pin 55 (Figs. 3 and 7) attached to a horizontal bar or plate 56 and extending outwardly through the mold 25. The outer end of the pin 55 is formed with a hook to engage the sprue.

Referring to Fig. 7, plates 57 are bolted to the plate 56 and form end extensions thereof. The plates 57 are slidably supported on rods 58 attached to the plate 20. Coil springs 59 mounted on the rods 58, hold the plate 56 against the plate 20. Stop bolts 61 adjustably mounted in the plates 57, are in alignment with stationary stops 62 which are adapted to protrude through openings 63 in the pillow block 21 when the mold sections are separated. When the die plate 20 and pillow block 21 are moved to the left (Fig. 3) for opening the molds, the pin 55 withdraws the sprue from the sprue hole 16, the sprue having been severed from the parison as above described. The stop bolts 61 (Fig. 7) engage the stationary stops 62 during the final outward movement of the pillow block so that the plate 56 is moved away from the die plate 20 and projects the hook end of the pin 55 beyond the face of the mold 25 through which the pin extends. This releases the sprue which has been completely withdrawn from the sprue hole 16, and permits it to drop by gravity.

The action of gravity in discharging the sprue may be supplemented by blowing a jet of air downwardly against the sprue. For this purpose a pipe 64 (Figs. 2 and 7) conveys air under pressure to a nozzle 65 which directs the air blast against the upper face of the sprue. A valve 66 (Fig. 7) in the pipe 64, is opened automatically by engagement with a lug 67 carried on the plate 57 and brought into engagement with the valve by the outward movement of the plate 57.

The blow mold sections may be cooled by the circulation of air or other cooling fluid through passageways 68 formed in the mold sections. The mold bottoms may also be cooled in like manner. We also have found it beneficial to supply heat to the parison molds and have provided electric cartridge heaters 68ᵃ for this purpose.

Air under pressure is supplied through a pressure pipe 70 (Figs. 2 to 4) for expanding the parisons in the molds and for ejecting the blown articles as hereinafter described. The pipe 70 is connected to a manifold 71 from which branch pipes 72 and 73 extend to conduits formed in the block 30, said conduits leading to the passageways 31 in the plungers 29. The supply of air through the pipes 72 and 73 is controlled by valves 74 and 75 respectively. The valves are actuated by an electric solenoid 76. The latter is operatively connected through a rock arm 77 to a rock shaft 78 mounted in brackets on the machine frame. Tappets 79 and 80 fixed to the rock shaft 78, are adapted to actuate the valves 75 and 74 respectively. When the slide block 30 is moved to the left, as shown in Fig. 2, the tappet 79 registers with the valve 75. When the block 30 is moved to the right, the valve 74 is brought beneath and in register with the tappet 80.

When the carriage 30 has been moved to the left (Fig. 2) and the mold 26 closed about the parison, the solenoid 76 is actuated automatically as hereinafter described, so that the tappet 79 opens the valve 75 and admits air pressure through the plug 29 in the mold 26. The air pressure opens the valve 32 in the plug and blows the parison to finished form. The solenoid 76 is then deenergized so that the valve 75 is closed. The molds are then opened and the finished bottle is ejected in a manner hereinafter described.

When a bottle has been blown, for example, in the mold 26 (Fig. 2), the valve 32 (Fig. 8) closes under the influence of the spring 33 so that when the valve 75 is closed at the completion of the blowing operation, air under pressure remains trapped in the blown bottle until after the mold opens unless there is a sufficient leakage to dissipate this residual pressure. This trapped air pressure is found to be objectionable because when the mold sections are separated there is a tendency for such pressure to suddenly blow the bottle downward against the mold bottom 42 before the latter has been withdrawn out of the path of the bottle, so that the relative lateral movement of the mold bottom and the bottle may mutilate or destroy the latter.

To overcome this difficulty, the following pressure relief mechanism is provided. A leaf spring 70ª (Fig. 2) is attached at one end to the tappet 79. The other end of the spring is attached to a contact block 70ᵇ which is pivoted to swing freely on the rock shaft 78. A rod 70ᶜ extends vertically downward through the pipe 73 and has its lower end seated on the valve stem 32'. The upper end of said rod is engaged by the contact block 70ᵇ. The operation of this pressure relief device is as follows:

When the bottle has been blown in the mold 26 and the tappet 79 is lifted permitting the valve 75 to close, the contact block 70ᵇ holds the valve 32 open momentarily during the upward motion of the tappets, the spring 70ª being strong enough to prevent the spring 33 from closing the valve 32 until such upward motion of the tappets is completed; the valve 75 having been closed at the beginning of such upward motion. This permits the air pressure in the blown bottle to be dissipated through the passage comprising the pipe 73 and open valve 75. The release of air pressure in the bottle occurs during the time interval between the closing of the valve 75 and lifting of the tappet 79ᵇ from the stem 79ᶜ, through flexure of the leaf spring 70ª. This mechanism for releasing the pressure in the mold 26 is duplicated for the mold 24.

Another method which we have discovered for relieving the internal pressure within the blown article, consists in using a mixture of air and steam in suitable proportions instead of air alone for blowing the article. When the parison has been blown, the steam condenses, thus reducing the internal pressure to substantially the external pressure on the walls of the blown article, thereby overcoming the above noted objection.

Although the use of air under pressure has been described for blowing the article, we have found that other fluids, both gases and liquids, may be used for this purpose. The use of air, however, has definite advantages over other fluids and has been proven to be efficient and generally satisfactory.

After an article has been blown and the mold sections separated so that the mold bottom 42 has been withdrawn from beneath the article, which tends to adhere to the plug 29, air under pressure is admitted for a brief interval by opening the valve (74 or 75). This forces the blown article downwardly, releasing it from the plug 29 and permitting it to be discharged from the machine. Such ejection of the article takes place after the mold has opened, but before the mold carriage 30 is shifted by its motor 36.

The machine is designed for complete automatic operation under the control of electrically operated control devices illustrated diagrammatically in Fig. 10. These control devices will now be pointed out, followed by a description of their sequence of operation in controlling a cycle of operations of the machine.

The control devices are designed to be energized by alternating current supplied through the mains 81 and 82. The switches and other controls are shown in Fig. 10 in the positions assumed when the molds are open, the mold bottom plates lowered and the feeder plunger 11 in its lifted position. A switch 83 is in circuit with the solenoid 76 which, as heretofore described, controls the supply of air for blowing the parisons in the molds and also for ejecting the blown articles. The switch 83 is normally closed, but is opened by a tappet 84 (Fig. 1) when the plunger 13 is lifted, in effect cutting off the supply of blowing air to the bottle. Two micro switches 85 and 86 are normally open and are closed (see Fig. 1) by the opening movement of the molds. The switch 85 controls the operation of the solenoid 76 for supplying ejecting air to the plunger 29. The switch 86 controls a timer device 87, the latter being reset when the molds close and the switch 86 opens. The purpose of the time delay device 87 is to control the time for application of air pressure when ejecting a bottle and it includes a solenoid 88 which when energized closes a switch 89 and opens a switch 90. A retarding device or dash pot 91 retards the movements of the switches. A solenoid 92 operates a four-way valve 93 controlling the fluid pressure supply to the motor 36 for operating the carriage 30. A coil 94 when energized closes a two-pole switch 95, 96 which is normally open. A single pole switch 97, which is normally closed, is opened by a solenoid 98 when the latter is energized. A solenoid 100 operates to open a switch 101 and close a switch 102. A normally open single pole switch 103 is closed by an electromagnet 104. A switch 105, which is normally closed, and a switch 106, which is normally open, are operated alternately on the mold closing cycles. A micro switch 107 which is normally closed, is actuated by the ram 13 (see Fig. 1), thereby breaking the circuit through a solenoid 108, which operates a four-way valve 109 controlling the motor 44 which raises and lowers the mold bottom plates.

The cycle of operations will now be described. With the parts as shown in Fig. 10, the solenoid 76 is energized, thereby holding the valve 75 open for supplying ejecting air to the blown article in the open mold. The circuit for the solenoid may be traced from the main 81 through conductor 110, solenoid 76, conductor 111, switches 85 and 90, and conductors 112 and 113 to the main 82. The solenoid 88 of the time delay device 87 is at this time energized, the circuit of the solenoid being through conductors 110, 114, switch 86, conductor 115, solenoid 88, and conductors 116, 113. The operation of the time delay device opens the switch 90 and then closes the switch 89. Opening of the switch 90 breaks the circuit through coil 76 so that valve 75 closes and cuts off the ejecting air. Closing of the switch 89 establishes a circuit through the solenoid 94. Said circuit extends through the switch 101 and may be traced from the main 81 through conductors 117, 118 switches 89 and 101, conductor 119, solenoid 94 and switch 97. The solenoid 94, being energized, closes the switches 95 and 96, the latter thereby establishing a circuit through the solenoid 92 so that the latter operates the valve 93, thus supplying air to the motor 36 and shifting the carriage 30. The molds then may be closed again by shifting the lever H and when the ram 13 is lowered for feeding a charge to the parison mold, the switch 107 is closed, thereby energizing the electromagnet 108 and operating valve 109, thus supplying air to the motor 44 for lifting the mold bottom plates. The lowering of the ram 13 also releases the switch 83, permitting it to close, thereby establishing a circuit through the solenoid 76, which then operates as heretofore described to supply air for blowing the parison in the mold. The spring tappet 84 (Fig. 1) holds the switch 83 open during the initial downward movement of the ram and until after the switch 107 is released to effect the lifting of the mold bottom plates. Also during the up stroke of the plunger, the tappet 84 opens the switch 83 before the valve 107 is opened.

The solenoid 92 which, as above noted, is energized by closing the switch 96, is retained in its closed position by an interlocking circuit extending from the main 81 through conductors 117, 121, switch 95, coil 94, and switch 97. This circuit through coil 94 is maintained independently of switch 89. When the ram 13 is lifted, the switches 107 and 83 are again opened. Opening of switch 107 reverses valve 109 so that the motor 44 is operated to lower the bottom plates. Opening of switch 83 de-energizes the solenoid 76 and shuts off the blowing air from the mold. The switch 106 is normally open and has just been closed by the closing of the molds. The closing of the switch 106 energizes the solenoids 100 and 104 which are connected in parallel in a circuit which may be traced from the main 81 through conductor 122, coils 100 and 104, conductor 123, switch 106 and conductors 124 and 125 to the main 82. The coil 100 being energized, operates to close the switch 102 and open the switch 101 while the coil 104 closes the switch 103. The closing of the switch 103 establishes a circuit for the coils 100, 104, through switch 105, independently of switch 106 so that said coils remain energized when the latter switch is again opened. The circuit for this interlock extends from the main 81 through the conductor 122, coils 100 and 104, conductor 123, switch 105, conductor 126, switch 103 and conductor 125 to main 82. The switch 102 also remains closed so that when the switch 89 is again closed, a circuit is established for the solenoid 98. This circuit extends from the main 81 through conductors 117, 118, switches 89, 102, conductor 127 and coil 98. The switch 97 is thus opened after the switch 89 has been closed on the succeeding cycle. The coil 98, being energized, opens the switch 97, thereby de-energizing the coil 94 so that the switch 96 is opened, de-energizing the coil 92, whereby the valve 93 is actuated to effect a shifting of the carriage 30 in the reverse direction. The carriage remains shifted until the molds are again closed which effects an opening of the switch 105. This de-energizes the coils 100 and 104 so that the switch 101 is closed. When the switch 89 is again closed, the coil 94 will be energized, thereby closing switch 96 and energizing coil 92 to effect a shifting of the carriage 30 for the next cycle.

Fig. 9 illustrates a modified construction designed for forming two parisons simultaneously and for thereafter blowing said parisons simultaneously in the finishing molds. This arrangement includes two parison molds $25^a$ and $25^b$ and three finishing molds $26^a$, $26^b$ and $26^c$, all of the molds arranged in a row with the parison molds and finishing molds in alternation. Four plugs or cores, $29^a$, $29^b$, $29^c$, and $29^d$, are carried on the carriage $30^a$. In order to charge the two parison molds simultaneously, branch channels or openings $16^a$ are extended from the sprue hole or channel 16 to the parison molds $25^a$ and $25^b$. The manifold $71^a$ is provided with four branch pipes leading to channels in the carriage block $30^a$, said channels being individual to and communicating respectively with the four hollow plugs. Valves $74^a$, $74^b$, $74^c$, and $74^d$ control the supply of air to the respective plugs. The tappet rod 78 is provided with three tappets $79^a$, $79^b$ and $79^c$.

With the parts in the position shown, the tappets $79^a$ and $79^b$ are in register with the valves $74^d$ and $74^b$ respectively for actuating said valves simultaneously and thereby supplying air to the parisons in the molds $26^a$ and $26^b$ and thereby simultaneously blowing the parisons to finished form. When the carriage is shifted to the right, the two parisons which have just been formed, are carried by the plugs $29^b$ and $29^d$ into position to be enclosed within the molds $26^b$ and $26^c$ respectively. By such movement of the carriage the valves $74^c$ and $74^a$ are moved into register with the tappets $79^b$ and $79^c$ respectively, permitting the parisons to be blown in the molds $26^b$ and $26^c$. The operation of the construction shown in Fig. 9 is substantially identical with that heretofore described in connection with the machine shown in Figs. 1 to 8 except that the increased number of molds and the arrangement thereof as above described results in the production of two bottles or blown articles during each cycle of operations instead of a single article.

Modifications may be resorted to within the spirit and scope of our invention.

We claim:

1. The combination of a mold comprising horizontally separable sections formed with a vertically disposed mold cavity and a restricted passageway through the lower end of the mold to said cavity, means for injecting molding material under pressure through said passageway into the mold cavity, means for separating the mold sections, a plunger mounted in one of the mold sections for shearing movement across said passageway, and automatic means for actuating the plunger and severing the sprue at the lower end of the mold before the mold sections are separated.

2. A mold comprising horizontally separable sections with vertical meeting faces, said mold having a vertically disposed mold cavity and a restricted pasageway extending through the bottom of the mold, means providing a channel forming a continuation of said restricted passageway and through which molding material is injected into the mold cavity, a pair of aligned blocks mounted respectively in the mold sections at the end of the mold cavity and having their inner faces in register with the meeting faces of the mold, one of said blocks having a groove in its face forming a portion of the walls of said restricted passageway, and means for shifting said blocks horizontally and thereby severing the sprue.

3. A mold comprising horizontally separable sections with vertical meeting faces, said mold having a vertically disposed mold cavity and a restricted passageway extending through the bottom of the mold, means providing a channel forming a continuation of said restricted passageway and through which molding material is injected into the mold cavity, a pair of aligned blocks mounted respectively in the mold sections at the end of the mold cavity and having their inner faces in register with the meeting faces of the mold, one of said blocks having a groove in its face forming a portion of the walls of said restricted passageway, means for retracting one of said blocks and means for causing the other said block to follow the retracted block and thereby shear the sprue from the material in the mold cavity.

4. A machine for molding articles from plastic material comprising a pair of oppositely disposed plates, sectional molds including a parison mold and a finishing mold, each comprising sections carried respectively by said plates, means for moving said plates toward and from each other and thereby closing and opening the molds, the parison mold being formed with a restricted opening through the bottom of the mold and communicating with the mold cavity, a bottom plate for the finishing mold, means for injecting plastic material through said opening into the parison mold cavity, a plug projecting into the parison mold cavity and forming a core, a carrier for said plug, means for shifting the carrier and thereby shifting said plug with the parison thereon from the parison mold to the finishing mold, means for blowing the parison to the form of a hollow finished article in said finishing mold, means for lowering said bottom plate, means for opening the finishing mold, means for supplying pressure through said plug for releasing the blown article therefrom, and timing mechanism for bringing said last mentioned means into activity while the finishing mold is open.

5. A machine for molding articles from plastic material, comprising a pair of oppositely disposed plates, sectional molds arranged in a row between said plates and each comprising separable sections connected respectively to the plates, said molds including a parison mold and a finishing mold on each side of the parison mold, said parison mold having a restricted opening through the bottom thereof, means for injecting molding material through said opening and forming a parison in the parison mold cavity, a pair of plugs, a carriage on which said plugs are carried, means for reciprocating said carriage lengthwise of said plates and thereby bringing said plugs alternatively into register with the parison mold while the other plug registers with a finishing mold, said plugs provided with openings extending lengthwise therethrough, said plugs serving as means for transferring parisons from the parison mold to the finishing molds respectively, and means for supplying fluid under pressure through the plugs while in the finishing molds for expanding the parisons.

6. A machine for molding articles from plastic material, comprising a pair of oppositely disposed plates, sectional molds arranged in a row between said plates and each comprising separable sections connected respectively to the plates, said molds including a parison mold and a finishing mold on each side of the parison mold, said parison mold having a restricted opening through the bottom thereof, means for injecting molding material through said opening and forming a parison in the parison mold cavity, a pair of plugs, a carriage on which said plugs are carried, means for reciprocating said carriage lengthwise of said plates and thereby bringing said plugs alternatively into register with the parison mold while the other plug registers with a finishing mold, said plugs provided with openings extending lengthwise therethrough, said plugs serving as means for transferring parisons from the parison mold to the finishing molds respectively, means for supplying fluid under pressure through the plugs while in the finishing molds for expanding the parisons, bottom plates for the finishing molds, means for lowering the bottom plates while the molds are closed, and means interconnected with the bottom plates for severing the sprue from the parison during the lowering of the bottom plates.

7. The combination of a parison mold, a finishing mold, each of said molds comprising separable sections movable to and from each other for opening and closing the mold, a plug having an air channel extending therethrough, a carriage on which the plug is mounted, means for reciprocating the carriage and thereby moving the plug into register with the said molds alternatively, means for closing the parison mold around the plug, means for injecting a charge of plastic material into the parison mold and forming a parison surrounding the plug, means for then opening the parison mold and moving the carriage to transfer the plug with the parison thereon to the finishing mold, means for closing the finishing mold around the parison, an air pressure line extending to said channel in the plug, a valve in said line, means for opening the valve for blowing the parison in the finishing mold and then closing the valve, means for opening the finishing mold after said closing of the valve, leaving the blown article supported on the plug, and timing mechanism operable to effect a second opening of the valve after the finishing mold has opened, thereby supplying air under pressure through the plug and disengaging the article from the plug.

8. The combination of a mold comprising partible sections, a plug or core, means for forming a parison of plastic material surrounding and attached to the core, means for enclosing the core and parison within the said mold, means for supplying air under pressure through said core and thereby blowing the parison within the mold, means for opening the mold and leaving the blown article supported on the core, valve mechanism controlling said air supply, and timing means for operating the valve mechanism to cut off the air supply to said core before said opening of the mold and operable after the mold is opened to again supply air pressure through the core for releasing the article therefrom.

9. A machine for molding articles of plastic material comprising a mold having partible sections and shaped to provide a mold cavity, means providing a pasageway extending to the mold and through one of said sections and opening into the lower end of the mold cavity, means for injecting plastic material through said passageway into the mold, means for separating the mold sections, a plunger mounted in one of the mold sections for shearing movement across said passageway, and automatic means for actuating the plunger and causing it to sever the sprue before the mold sections are separated.

10. The combination of a mold comprising horizontally separable sections having vertical meeting faces and formed with a vertically disposed mold cavity and a restricted passageway extending along said faces through the lower end of the mold to said cavity, means for injecting molding material under pressure through said passageway into the mold cavity, means for separating the mold sections, and automatic means for severing the sprue at the lower end of the mold before the mold sections are separated, said severing means including a severing block mounted in one mold section and having a face flush with the said meeting faces of the mold sections, said block having a groove in the said face thereof and forming a portion of said restricted passageway, and means for moving said block transversely of said faces and thereby severing the sprue.

11. A machine for molding plastic material comprising a pair of oppositely disposed vertical plates, a parison mold and a finishing mold, each comprising partible sections carried respectively by said plates and having vertical meeting faces, means for moving said plates horizontally toward and from each other and thereby closing and opening the molds, the meeting faces of the mold sections all being in the same vertical plane when the molds are closed, said parison mold being formed with a restricted opening extending through the bottom thereof and communicating with the mold cavity, means for injecting plastic material through said opening into the parison mold cavity and thereby forming a parison, a plug projecting into the parison mold cavity and forming a core around which the parison is formed, a carrier for said plug, means for shifting the carrier horizontally in a direction parallel with said plane and thereby shifting said plug with the parison thereon from the parison mold to the finishing mold, and means for blowing the parison to the form of a hollow finished article in said finishing mold.

12. A machine for molding plastic material comprising a pair of oppositely disposed vertical plates, a parison mold and a finishing mold, each comprising partible sections carried respectively by said plates and having vertical meeting faces, means for moving said plates horizontally toward and from each other and thereby closing and opening the molds, the meeting faces of the mold sections all being in the same vertical plane when the molds are closed, said parison mold being formed with a restricted opening extending through the bottom thereof and communicating with the mold cavity, means for injecting plastic material through said opening into the parison mold cavity and thereby forming a parison, a plug projecting into the parison mold cavity and forming a core around which the parison is formed, a carrier for said plug, means for shifting the carrier horizontally in a direction parallel with said plane and thereby shifting said plug with the parison thereon from the parison mold to the finishing mold, and means for blowing the parison to the form of a hollow finished article in said finishing mold, the finishing mold including a bottom plate, means for lowering said bottom plate, means for supplying pressure through said plug for releasing the blown article therefrom, and timing mechanism for bringing said last mentioned means into activity while the finishing mold is open.

13. Apparatus for molding articles from plastic material comprising a mold having separable sections, means for introducing a blank of plastic material into the mold, an air pressure line leading to the mold for supplying air under pressure to the blank and blowing the latter to hollow form within the mold, a valve in said line, automatic means for opening the valve to supply air pressure to the blank and blow it to hollow form within the mold and for then closing the valve, means for dissipating the superatmospheric pressure within the blown article, and means for thereafter opening the mold.

14. Apparatus for molding articles from plastic material, said apparatus comprising in combination a mold comprising partible sections, a plug formed with a passageway therethrough, said plug including a check valve for closing the passageway, means for forming a parison of the plastic material and attaching it to the plug, means for closing the mold around said plug and parison, means providing an air pressure line leading to the plug, valve mechanism including a valve in said line, means for actuating the valve mechanism for opening the valve and admitting air under pressure to the plug and thereby blowing the parison to hollow form within the mold and for thereafter closing the valve in said line, automatic means actuated by said valve mechanism for opening the check valve in the plug and dissipating the air pressure within the blown article, means for then opening the mold, and means for momentarily opening said line valve and thereby supplying pressure within the blown article for ejecting it from the plug.

15. A machine for molding articles from plastic material, comprising a sectional mold formed with a mold cavity therein, an injector, means providing a passageway from the injector to the mold cavity, means for injecting material through said passageway into the mold, shearing means positioned at the confluence of said passageway and mold cavity and operable to shear the sprue formed in said passageway from the molded article in the mold, means for separating said mold sections after the sprue is severed, and a sprue ejecting device carried by one of said sections and operable to withdraw the severed sprue from said passageway when the mold sections are separated.

16. The combination of a mold comprising separable sections formed to provide a mold cavity, an injector device spaced from the mold cavity, means providing a passageway from said injector device to the mold cavity through which material is injected into the mold, shearing means positioned at the junction of said passageway and mold cavity and operable to shear the sprue formed in said passageway from an article in the mold while the mold is closed, means for separating the mold sections, and means for automatically withdrawing the severed sprue from said passageway and discharging it as the mold sections are separated.

17. The combination of a mold comprising separable sections shaped to provide a mold cavity, an injector device, means providing a channel extending from the injector to the mold cavity through one of said sections, means carried by the other mold section for withdrawing the sprue from said channel when the mold sections are separated, a shearing device interposed between said last mentioned means and the mold cavity, means for actuating said shearing device for severing the sprue at the mold, and means for discharging the severed sprue after it is withdrawn.

18. The combination of a mold comprising separable sections shaped to provide a mold cavity, an injector device, means providing a channel extending from the injector to the mold cavity through one of said sections, means carried by the other mold section for withdrawing the sprue from said channel when the mold sections are separated, a shearing device interposed between said last mentioned means and the mold cavity, means for actuating said shearing device for severing the sprue at the mold, said means for withdrawing the sprue including a hook extending into said passageway and to which the sprue attaches itself during the injection operation, and means for blowing an air blast against the sprue when the latter is withdrawn and thereby insuring its disengagement from the hook.

STEPHEN T. MORELAND.
VICTOR E. HOFMANN.
PARKER C. TRACY.